Dec. 20, 1966 TOSHIO MITSUI 3,293,365

TELEPHONE ANSWERING AND RECORDING APPARATUS WITH A SINGLE AMPLIFIER CIRCUIT

Filed July 22, 1964 2 Sheets-Sheet 1

INVENTOR
TOSHIO MITSUI
BY
Hopgood & Calimafde
ATTORNEYS

Dec. 20, 1966 TOSHIO MITSUI 3,293,365

TELEPHONE ANSWERING AND RECORDING APPARATUS WITH
A SINGLE AMPLIFIER CIRCUIT

Filed July 22, 1964 2 Sheets-Sheet 2

INVENTOR
TOSHIO MITSUI
BY
Hopgood & Calimafde
ATTORNEYS

United States Patent Office 3,293,365

Patented Dec. 20, 1966

3,293,365

TELEPHONE ANSWERING AND RECORDING APPARATUS WITH A SINGLE AMPLIFIER CIRCUIT

Toshio Mitsui, Tokyo, Japan, assignor to Nippon Electric Company Limited, Minatoku, Tokyo, Japan, a corporation of Japan Filed July 22, 1964, Ser. No. 384,313
Claims priority, application Japan, Aug. 24, 1963, 38/45,007
6 Claims. (Cl. 179—6)

This invention relates to a telephone answering and message recording instrumentality and in particular to one for integration with the standard subset, but bypassing the carbon microphone, earpiece and hold circuit thereof.

Conventional telephone answering devices take many forms, depending upon their versatility. The simpler devices are encumbered by the requirement for acoustical coupling to the handset, which, of course, reduces the tone quality and increases the recorded and transmitted noise levels. Such devices also generally include the disadvantage inherent in their mechanical rather than electrica effectuation (i.e. the physical lifting of the handset). Devices which provide a direct line coupling, on the other hand, tend to be electrically complex, particularly as their versatility increases. The resulting servicing problems, high price, and unwieldiness have generally retarded their practicality and widespread acceptance.

Accordingly, it is the object of this invention to provide a telephone answering device which is practical to manufacture and simple to operate and maintain, yet which provides the advantages of direct line-to recording store coupling and the following multi-purpose functions.

(1) Recording of an announcement to be transponded to a calling party, either through the telephone or through an auxiliary microphone, in an announcement recording store.

(a) Simultaneously erasing the previous announcement.

(b) Initiating mechanical shut off and electrical standby upon completion of the announcement cycle.

(2) Reproducing the foregoing announcement to ensure its correctness through either the telephone instrument or a speaker.

(3) Automatically seizing the telephone line upon an incoming call, and (a) Transponding the recorded announcement.

(b) Signalling the calling party to begin his message.

(c) Recording the message on a second storage device for a predetermined time period while simultaneously erasing messages recorded on the previous cycle.

(d) Shutting down the equipment upon the termination of this period and reassuming stand-by or (e) Signalling the calling party that the message recording store is full, and (f) Repeating the signal in (e) to subsequent callers without initiating the other steps supra, and (g) Releasing the line.

(4) Allowing remote playback by the equipment owner.

(a) If the message recording store is only partially full by:

(i) responding to a predetermined signal emanated remotely by the owner over the telephone;
(ii) translating the message store at high speed until its end is reached;
(iii) recycling the message store at normal playback speed and transmitting the messages recorded during absence;

(iv) removing the influence of the message store timer (see 3(c));
(v) controlling the playback period by the recorded voice frequency signal or the end of the recording cycle;
(vi) shutting down the equipment at the termination of the above period;
(vii) releasing the line and assuming standby.

(b) If the message recording store is full by:

(i) responding to a predetermined signal emanated remotely by the owner over the telephone;
(ii) precluding the high speed translation of 4(a) (ii) supra and initiating at normal speed the reproduction of recorded messages;
(iii) removing the influence of the message store timing (see 3(c));
(iv) removing the effect of the 3(e) signal indicating the message recording store is full;
(v) shutting down the equipment at the termination of the above period;
(vi) releasing the line and assuming standby.

(5) Allowing local playback of messages recorded during absence when the owner returns.

It is a further object of this invention to provide the foregoing functions with only a single amplifier circuit which assumes the correct amplification direction with respect to the announcement and message recording stores, telephone line, auxiliary speakers, and telephone handset.

It is to be understood that the phrases message store and announcement store used in the foregoing intend a generic meaning which incorporates all practical modes of intelligence storage capable of being cycled and recycled to derive the delineated functions. For example, while tape loops are shown and described in the following embodiment for each of these functions, a magnetic drum may also be used so long as apparatus is added which will automatically return the read and record transducers to the beginning upon the end being reached. This relative travel from the beginning to the end of a storage device (or the data thereon), by its associated transducer, is defined herein as a cycle.

The above mentioned and other features and objects of this invention and the manner of attaining them will become more apparent and the invention itself will best be understood by reference to the following description of an embodiment of the invention taken in conjunction with the accompanying drawings wherein.

Figure 1:
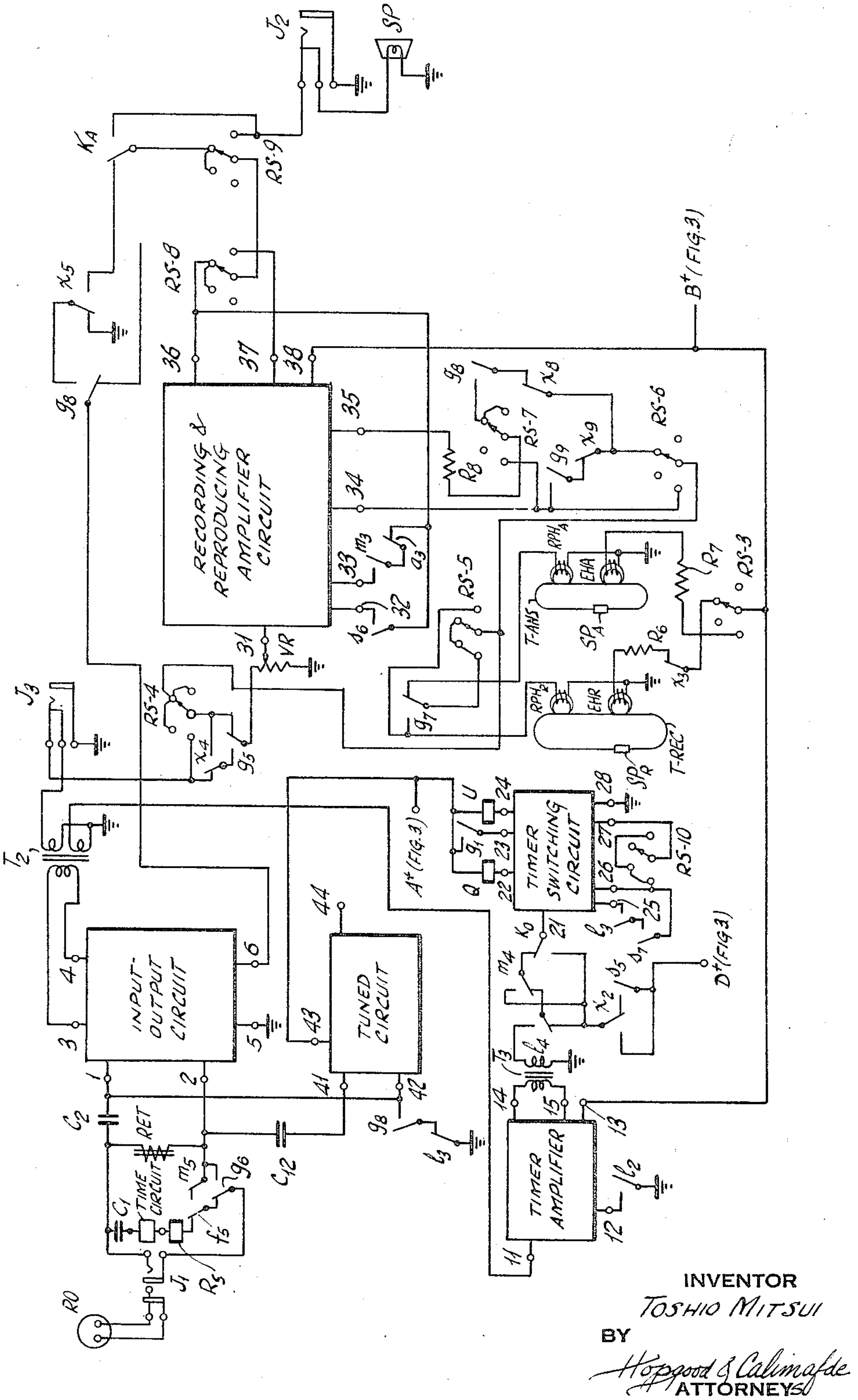
FIG. 1 illustrates in combined block schematic form the input, output, recording and intermediate circuits of the invention.

In the drawings and in the description pertaining thereto, the following generic nomenclature is employed, chosen insofar as possible to be suggestive of its function.

A+, B+, C+, D+—D.C. supply voltages
R with numeral subscripts—Resistors
D with numeral subscripts—Diodes
RECT with numeral subscripts—Rectifier bridges
C with numeral subscripts—Capacitors
J with numeral subscripts—Connecting jacks
T with numeral subscripts—Transformers
PC with numeral subscripts—Plungers
PB with numeral subscripts—Non-locking switch
RS with numeral suffixes—Interlocking rotary switches
A, F, G, J, K, L, M, Q, R, S, U, V, and X—Relays
*a, f, g, j, k, l, m, q, r, s, u, v,* and *x* with numeral subscripts—Contacts of the associated relay.

Additional specific nomenclature, not listed above, will be delineated hereinafter in connection with the devices to which they pertain.

The invention will now be described with reference to FIGS. 1 to 3. Where ambiguity may arise as to which figure is being referred to, the reader's attention will be properly directed by the use of parenthetical reference.

In order to present the invention in a manner which will most clearly portray the function and interrelationship of the various elements, the sequential steps constituting its utilization will be described dynamically as opposed to a more formal and less clear tracing of unactivated circuitry. At this junction it bears mentioning that particular circuits not described in detail, such as the power supply circuit, or those circuits represented by blocks are well known to those versed in the art and for the sake of brevity will not be reiterated here.

*(1) Recording the announcement to be automatically transponded to a calling party*

In order to record an announcement which the departing party wishes to convey to those who call during his absence, the power supply is energized by the switch SW (FIG. 3) and the equipment coupled in parallel with the telephone at the line wire terminal RO via the jack $J_1$. The interlocking rotary switches RS–1 to RS–10 are now set to the first position o fthe four possible positions. In order to avoid cluttering the drawings, the number of the positions have been omitted, however, they may be visualized as reading from left to right (clockwise). The nonlocking starting button $PB_1$ (FIG. 2) is depressed operating the self-held (via contact $f_2$) relay F through the circuit $C^+$, F, RS–2, $PB_1$ and ground. As a result of the energization of relay F, the plunger $PC_1$ and motor MO are activated by the contacts $f_3$ and $f_4$ respectively (FIG. 3). The motor initiates the tape drive through a transmission selected by the particular plunger energized in the well known manner. In this case plunger $PC_1$ causes the motor to drive the automatically responding announcement tape T-ANS upon which it is now desired to record.

The recording circuit continuity is established from the telephone instrument to the input-output dividing circuit terminals 1 and 2 via $f_5$. The output of the input-output circuit is led to the recording and reproducing amplifier from the terminals 3 and 4 thereof through coupling transformer $T_2$, RS–4, $g_5$ and potentiometer VR. The amplifier output is taken from terminal 34 and applied to the recording head $RPH_A$ of the tape T-ANS through the circuit RS–6, RS–5, and $g_7$. Recording bias is obtained from terminal 35 of the recording and reproducing amplifier and is applied in parallel to the recording head $RPH_A$ via $R_8$ and RS–7.

The previous record on the tape T-ANS is erased by the $B^+$ bias provided the erasing head $EH_A$ through RS–3 and $R_7$ and the equipment owner may now by speaking into his telephone record the announcement to be automatically given in response to a call. If desired, the recording may take place independently of the telephone by plugging a microphone into jack $J_3$.

When the tape has undergone 360° of rotation, a short conducting bar $SP_A$ contacts and thereby shorts $SB_A$ (FIG. 2) energizing relay S. This applies $D^+$ to the timing switching circuit terminal 21 via $s_5$, $x_2$, $l_4$, $m_4$, and $K_o$. The relays Q and U (FIG. 1) are thereby energized. Ordinarily, as will be later described, relay U is energized for a predetermined operating time (internally in the switching circuit, not shown), however, because of the function presently under consideration this is not necessary, and a new short operating time is effected by the short circuit of terminals 26 and 27 via RS–10. The operation of relay U releases relay F via $u_1$ and the equipment deactivates itself (e.g. contact $f_4$ opens, shutting off the motor) and assumes standby status.

*(2) Reproduction of the automatically transponded message*

In order to hear the announcement thus recorded and insure its correctness, the interlocking switches RS–1 to RS–10 are set to the second position from the left and the starting button $PB_1$ is depressed as before. This operates self held relay F as in case (1) above and the tape T-ANS is similarly set in motion. $RPH_A$ now functions as a reading head and its output is applied to the input of the recording and producing amplifier via $g_7$, RS–5, RS–4, $g_5$, and VR. The amplifier output is derived from terminal 36 and led back to the telephone handset (from which it is heard) through a path constituted by RS–8, RS–9, $g_8$ and the input-output circuit. If desired, rather than being heard through the handset, changeover switch $K_A$ may be displaced and the announcement will appear either at the monitor jack $J_2$ or the speaker SP. Deactivation to standby status is the same as in case (1) above.

*(3) Automatic operation*

Upon leaving home, the equipment owner sets interlocking rotary switches RS–1 to RS–10 to the third position. Upon an incoming call, the time circuit responds, after a predetermined time, to the ringing current activating relay $R_S$, which is a double winding relay; the second winding of which is represented by $R_P$ (FIG. 2), thereby being self held via its contact $r_1$. Thus relay F is energized by contact $r_2$ and plunger $PC_1$ and motor MO are energized as before. Contact $f_5$ provides D.C. line continuity (a D.C. current path), and hence a holding circuit for the incoming line, through the choke RET and since the circuit status is now similar to that in case (2) the recorded announcement is automatically transmitted to the calling subscriber. When the tape T-ANS has undergone 360°, the short bar $SP_A$ again instantaneously short circuits the terminals $SB_A$, energizing relay S for a brief period (i.e. for the time during which the short bar establishes continuity for the energizing current). The operation of relay S shorts via contact $s_6$ the terminals 36 and 32 of the recording and reproducing amplifier, inducing positive feedback (terminal 32 being an input terminal) and therefore oscillation. The oscillation lasts for the duration of the energization of the S relay (which as mentioned is a short time) and is a signal to the calling subscriber to start his message.

Relay S has also energized relay U via the timing switching circuit as before, however, this time terminals 26 and 27 are not shorted (RS–10 being now in the third position) and the operating time of relay U is for its full predetermined period. The period is preset to correspond to the length of time which the equipment owner desires to allow each incoming message.

Figure 2:
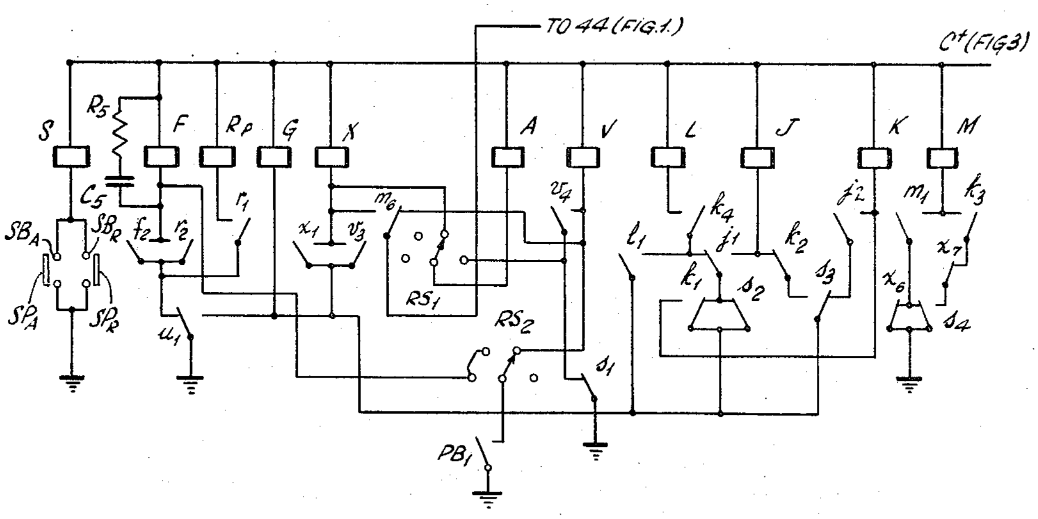
FIG. 2 shows the relay network employed to actuate the corresponding contacts in FIG. 1.
Figure 3:
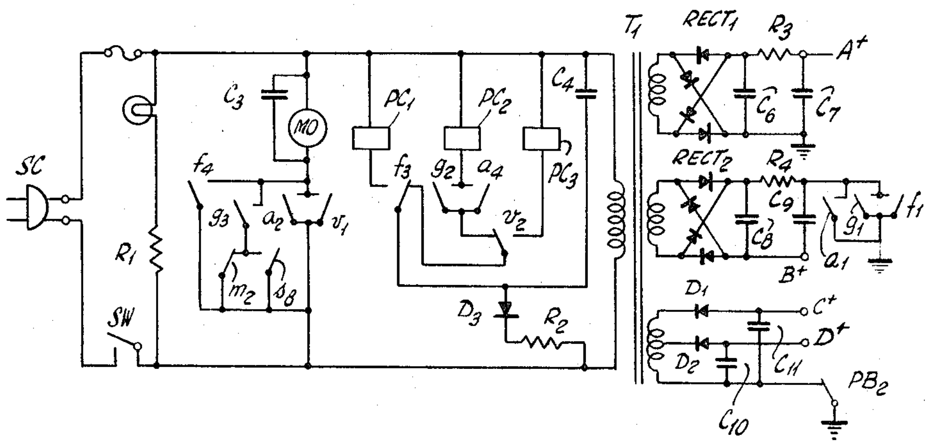
FIG. 3 shows the power supply and motor circuits of the invention.

Upon relay U operating relay F is released as before and relay G energized (FIG. 2). Motor MO continues to be energized via contact $g_3$, however, the operation of relay G energizes plunger $PC_2$ via $g_2$, $v_2$, and $f_3$ At this juncture it bears mentioning that relay G is given a reaction time which is insufficient to enable it for the short U cycle previously encountered. Plunger $PC_2$ couples the motor through a transmission (not shown) to the driving mechanism for the message receiving tape T-REC. Continuity from the telephone to the recording amplifier is established via $g_6$, the input-output circuit, coupling transformer $T_2$, $x_4$, $g_5$, and VR; and from the amplifier to the recording head $RPH_R$ via output terminal 34, $g_9$, $x_9$, RS–6, RS–5, and $g_7$. Recording bias is again provided by terminal 35 and is furnished the recording head in parallel via $r_8$ RS–7, $g_8$ and $x_8$. Previous recordings are meanwhile erased by the erasing head $EH_R$ by $B^+$ supplied via RS–3, $x_3$, and $r_6$.

All of the foregoing has taken place in an extremely short period following the oscillation signal indicating to the calling party to begin his message. Assuming now the message has been given and recorded as described, the timing switching circuit has meanwhile ticked off the time allotted to the calling party (the caller will generally be informed of this time allotment in the initial automatically responded message) and the relay U is now released, releasing relay G and returning the equipment to standby.

Subsequent calls are treated similarly and recorded serially on the tape T-REC. Needless to say, this tape is given a much greater capacity than that of the automatic message tape T-ANS.

When tape T-REC is full no more messages can be recorded, and to insure that previous messages are not erased and that the calling party is so informed, the following procedure is effected. Upon the changeover from the automatically responded message to the recording phase, the relay S having briefly responded as before due to $SP_A$, the relay J is energized via $k_2$, $s_3$, and $u_1$ and is self held by $j_1$ regardless of the relay S's release or subsequent operation (reference to FIG. 2 will indicate there are a duality of paths furnished for this purpose). The relay K now operates via $j_2$, $s_3$, and $u_1$ and is self held by contact $k_1$.

The tape T-REC is now driven as before, however, this time, since it is full, its starting bar $SP_R$ shorts the $SB_R$ contacts, again energizing relay S. This energizes relay M through $k_3$, $x_7$ and $s_4$ which is self held by contact $m_1$.

The operation of relay M opens the motor circuit (via $m_2$) stopping the equipment, and at the same time consitutes a different positive feedback circuit in the recording and reproducing amplifier (33, $m_3$, $a_3$ and 36) from that previously constituted and the resultant oscillation serves as a "record full" signal to the calling party (who may be informed of the import of this signal in the announcement transmitted to him). Thereafter relay U is released as are the rest of the relays which are controlled by contact $u_1$, and only relay M remains energized to give the "record full" signal.

Subsequent calls to the equipment where the receiving tape T-REC is full are handled in the following manner. Relays $R_S$, $R_P$, F operate as before as does plunger $PC_1$ and the motor MO. This of course activates T-ANS and it begins to traverse the reading and recording head. Since, however, contact $m_5$ is open, no D.C. holding path is constituted for the telephone circuit. When the T-ANS tape undergoes 360° so that it activates the relay S via its shorting bar $SP_A$, relays U and G respond as before releasing relay F. The motor MO therefore stops ($m_2$ being open) and at this time the "record full" signal is transmitted to the calling party. This signal is initiated as before by the positive feedback of the amplifier from terminal 36 to 33 and is transmitted through contact $g_6$. The relay U releases after the prescribed time and only the relay M remains energized.

With the inventive concept the equipment owner may make use of the messages so recorded either remotely or after returning to his home; the two possibilities will be discussed sequentially.

(4) *Remote Playback*

When the equipment owner calls his own home the recorder may be in one of two conditions, i.e. the record may be either partially full or full, and thus the relay M unenergized or energized. The former condition will be examined first.

When the call is received the equipment initially responds as in case (3) above (first part—record partially full). However, the owner is equipped with a device which emits a predetermined frequency signal to which the tuned circuit in the equipment is adapted to respond. Needless to say, any coding arrangement known to those versed in the art would suffice. After a predetermined time, the terminals 43 and 44 of the tuned circuit are switched to equipotential and $A^+$ is applied to relay V through $m_6$ energizing it. Relay X is therefore energized via contact $v_3$ and is self held by $x_1$.

Due to the operation of relay V, the plunger $PC_2$ is incapable of being energized and in its stead plunger $PC_3$ is activated via contact $v_2$. The purpose of plunger $PC_3$ is to insert (not shown) a high speed transmission between the motor and T-REC tape drive. The reading head $RPH_R$ output is applied to the amplifier input at VR via $g_7$, RS–5, RS–4, $x_4$ and $g_5$. The output of the amplifier is derived at terminal 36 and fed to the telephone circuit through RS–8, RS–9, $x_5$, $g_8$ and the input-output circuit.

In this quick-feed condition the short bar $SP_R$ of tape T-REC soon shorts the contacts $SB_R$ causing S to become energized for the second time during this phase. The contact $s_1$ releases relays J and V and therefore $PC_3$ returning the tape speed to its normal value attained by $PC_2$.

In this condition, since the relay K remains self held by contact $k_1$, the relay L operates via $k_4$, $j_1$, $s_2$, and $u_1$, and thus the timer circuit amplifier operates (FIG. 1) via $l_2$ and is connected to the switching circuit by means of contact $l_4$ (assuming the change-over contact $K_o$ is set as shown). The timer amplifier thus provides a very useful function; serving to hold the relay U during the time which a voice frequency signal (i.e. recorded messages) appears at the tape T-REC and thereafter releasing the equipment. Should the change-over contact $K_o$ be set in the other position, this circuit would be bypassed and the tape T-REC would be driven to its end and would stop independently of recorded intelligence.

The reproducing circuit at this time is the same as it was in the quick-feed condition of the tape and is directly connected to the telephone circuit, avoiding the carbon transmitter and therefore extraneous noises.

Where the T-REC tape is full, the equipment is at this time in the "record full" status of the latter part of case (3). Thus when the owner emits his special signal, the relay M which was previously energized prevents the actuation of relay V through the tuned circuit as was the case immediately above. In this case, however, because contact $m_6$ (FIG. 2) has swung over to the X side, relay X rather than V is actuated and plunger $PC_2$ rather than $PC_3$ actuates as the other relays respond. There is thus no speed up and the tape T-REC is normally reproduced over the line as in the case immediately above, after return to normal speed. When the T-REC tape reaches the end relay M is released because of the instantaneous energization of relay S; the relay X being energized during the remote control as described. In other words, at the time the tape reaches the end, both of contacts $s_4$ and $x_6$ are open, allowing M to release. The tape T-REC is now in condition for an entirely new recording.

(5) *Local play back*

If the equipment owner has not previously played back the messages recorded in his absence, he may do so upon returning home as follows.

The interlocking rotary switches RS–1 to RS–10 are set to the fourth position at the extreme right. This energizes relay A through RS–1 and $s_1$, and the motor MO and plunger $PC_2$ (for driving T-REC) are set in operation through contacts $a_2$ and $a_4$ respectively.

The reproducing circuit from the reading head $RPH_R$ to the amplifier input at VR is constituted by the path RS–5, RS–4, and $g_5$. The output 37 of the amplifier is employed to drive the speaker through RS–8 and RS–9. Alternatively, the play back may be heard by inserting ear phones in the jack $J_2$.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a telephone answering device of the type having an announcement store and a message store, and means for driving each relative their respective transducers for delivering a record announcement in response to an incoming call and recording the massage in response thereto from the calling party, the improvement therein comprising: means responsive to an incoming call for establishing a D.C. holding circuit for the telephone line; an amplifier circuit; means responsive to an incoming call for driving said announcement store and coupling said amplifier circuit in readout relation between said line and the announcement store transducer; means responsive to the completion of the announcement cycle for deactivating said announcement store driving means, activating the message store driving means and coupling said amplifier circuit in recording relation between said line and the message store transducer for a predetermined time; means responsive to a predetermined signal over said line for activating the message store driving means, coupling said amplifier circuit in readout relation between said line and the message store transducer, for recycling said message store from the beginning and for negativing said predetermined time effect and allowing said message store to recycle independent thereof; and means responsive to a predetermined condition of said message store during the recycle for releasing said line and returning said telephone answering device to its condition before the reception of the incoming call.

2. The improvement claimed in claim 1 further comprising means responsive to the full state of said message store preventing the recording relation of said message store to said line through said amplifier, and means also responsive to the full state of said message store for indicating to the calling party said state.

3. The improvement claimed in claim 2 in which said full state indicating means comprises means for feeding back the amplifier circuit output to its input thereby causing oscillation, and means for imposing this oscillation on the line.

4. The improvement claimed in claim 1 in which the means for driving said message store has high and normal speeds and in which the signal responsive means activates the high speed drive in the absence of a full condition of the message store, and means responsive to the end of the message store cycle for recycling said store at normal speed.

5. The improvement claimed in claim 1 further comprising means responsive to the completion of the announcement cycle for putting voice frequency signal of short duration over the line indicating the event.

6. The improvement claimed in claim 5 in which said voice frequency signalling means comprises means for feeding back the amplifier circuit output to its input.

References Cited by the Examiner

UNITED STATES PATENTS

| | | | |
|---|---|---|---|
| 2,519,568 | 8/1950 | Handschin | 179—6 |
| 2,539,139 | 1/1951 | Jordanoff et al. | 179—6 |
| 2,833,860 | 5/1958 | Roberts et al. | 179—6 |
| 2,946,852 | 7/1960 | Brown et al. | 179—6 |
| 3,067,289 | 12/1962 | Zimmerman | 179—6 |

BERNARD KONICK, *Primary Examiner.*

IRVING SRAGOW, JAMES M. MOFFITT, *Examiners.*

A. I. NEUSTADT, *Assistant Examiner.*